US 9,071,035 B2

(12) United States Patent
Otani et al.

(10) Patent No.: US 9,071,035 B2
(45) Date of Patent: Jun. 30, 2015

(54) OPTICAL AMPLIFIER AND METHOD OF CONTROLLING OPTICAL AMPLIFIER

(71) Applicant: FURUKAWA ELECTRIC CO., LTD., Tokyo (JP)

(72) Inventors: Eisuke Otani, Tokyo (JP); Toru Yoshikawa, Tokyo (JP); Nobuyuki Kagi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/284,436

(22) Filed: May 22, 2014

(65) Prior Publication Data
US 2014/0253998 A1 Sep. 11, 2014

Related U.S. Application Data

(63) Continuation of application No. PCT/JP2012/080392, filed on Nov. 22, 2012.

(30) Foreign Application Priority Data

Nov. 25, 2011 (JP) ................................. 2011-258179

(51) Int. Cl.
H01S 3/00 (2006.01)
H01S 3/10 (2006.01)
G02F 1/35 (2006.01)
H01S 3/13 (2006.01)
H04B 10/077 (2013.01)
H01S 3/30 (2006.01)
H01S 3/102 (2006.01)
H01S 3/131 (2006.01)
H01S 3/067 (2006.01)

(52) U.S. Cl.
CPC ........... *H01S 3/10038* (2013.01); *H01S 3/1022* (2013.01); *H01S 3/1312* (2013.01);
(Continued)

(58) Field of Classification Search
CPC ............ H01S 3/094003; H01S 3/1022; H01S 3/1312; H01S 3/302
USPC ........................................ 359/337.11, 341.41
See application file for complete search history.

(56) References Cited

U.S. PATENT DOCUMENTS 6,785,042 B1 * 8/2004 Onaka et al. .................. 359/334
2002/0060837 A1 5/2002 Inagaki et al.
(Continued)

FOREIGN PATENT DOCUMENTS

JP 6-21582 1/1994
JP 2000-151515 A 5/2000
(Continued)

OTHER PUBLICATIONS

International Search Report issued on Jan. 22, 2013 for PCT/JP2012/080392 filed on Nov. 22, 2012 with English Translation.
International Written Opinion mailed on Jan. 22, 2013 for PCT/JP2012/080392 filed on Nov. 22, 2012.

*Primary Examiner* — Mark Hellner
(74) *Attorney, Agent, or Firm* — Oblon, McClelland, Maier & Neustadt, L.L.P.

(57) ABSTRACT

An optical amplifier comprising: a pumping light source supplying a pumping light to an optical fiber as an amplification medium; an ASE light power detector detecting an ASE light power including an external ASE power flowing from an upstream side outside an amplification signal band; and a control unit setting a gain within the amplification signal band by using the ASE light power detected by the ASE light power detector outside the amplification signal band. The control unit controls the pumping light source by compensating for an influence of the external ASE power, obtained by measuring a relationship between the gain within the amplification signal band and the ASE light power outside the amplification signal band, to set initially the gain within the amplification signal band.

14 Claims, 11 Drawing Sheets

(52) U.S. Cl.
CPC .............. *G02F 1/35* (2013.01); *H01S 3/06754* (2013.01); *H01S 3/1301* (2013.01); *H01S 2301/02* (2013.01); *H01S 2301/04* (2013.01); *H04B 10/0777* (2013.01); *H01S 3/10015* (2013.01); *H01S 3/302* (2013.01)

(56) References Cited

U.S. PATENT DOCUMENTS

| | | |
|---|---|---|
| 2003/0189751 A1 | 10/2003 | Inagaki et al. |
| 2005/0024712 A1 | 2/2005 | Hiraizumi et al. |
| 2006/0024063 A1* | 2/2006 | Onaka et al. .................. 398/149 |
| 2006/0198017 A1 | 9/2006 | Inagaki et al. |
| 2009/0153951 A1 | 6/2009 | Hiraizumi et al. |
| 2010/0272445 A1 | 10/2010 | Inagaki et al. |
| 2011/0019268 A1 | 1/2011 | Hiraizumi et al. |
| 2011/0026104 A1 | 2/2011 | Hiraizumi |
| 2011/0141552 A1 | 6/2011 | Ghera et al. |

FOREIGN PATENT DOCUMENTS

| | | |
|---|---|---|
| JP | 2003-177440 A | 6/2003 |
| JP | 2006-189465 A | 7/2006 |

* cited by examiner

SIGNAL BAND
Δλ

λ ase
ASE LIGHT POWER
MONITO
WAVELENGTH

PUMPING LIGHT: OFF
SIG_off
TOTAL_ASE_off

ASE LIGHT POWER
MONITOR
ASE_off

PD_off

OPTICAL AMPLIFIER AND METHOD OF CONTROLLING OPTICAL AMPLIFIER

CROSS-REFERENCE TO RELATED APPLICATION

This application is a continuation of PCT International Application No. PCT/JP2012/080392 filed on Nov. 22, 2012 which claims the benefit of priority from Japanese Patent Application No. 2011-258179 filed on Nov. 25, 2011, the entire contents of which are incorporated herein by reference.

BACKGROUND OF THE INVENTION

1. Field of the Invention

The present invention relates to an optical amplifier and a method of controlling an optical amplifier in which a gain within a present amplification signal band is initially set based on an ASE (amplified spontaneous emission) optical power.

2. Description of the Related Art

Conventionally, in an optical amplifier using an optical fiber as a medium that amplifies an optical signal, there is a correlation between a gain and an ASE light. That is, an ASE light power Pase and a gain G have a relationship of Pase=K×G. Herein K is a proportional constant between the ASE light power and the gain. Hereby in some optical amplifiers, a pumping light power or an ASE light power is controlled by monitoring the ASE light power to calculate a gain so that the calculated gain becomes a setting value (see Japanese Laid-open Patent Publication No. H6-21582).

For example, in a case of a Raman amplifier, a Raman gain is indicated as a ratio of a signal light power when a pumping light is on relative to a signal light power when the pumping light is off. However, the Raman gain cannot be monitored in an amplification operation since the pumping light cannot be off in the amplification operation. In such a case, a gain of the Raman amplifier can be controlled by monitoring an ASE light to indirectly obtain a Raman gain by using the above-described proportional relationship and by controlling a pumping light power so that the Raman gain becomes a setting value.

When a pumping light is input into an optical fiber of a Raman amplifier, a gain is obtained at a position shifted to a longer wavelength side relative to that of the pumping light by approximately 100 nm. A Raman gain or a tilt which is a wavelength dependency of the Raman gain is controlled by controlling the pumping light power (see U.S. Patent Application Publication No. 20110141552).

SUMMARY OF THE INVENTION

It is an object of the present invention to at least partially solve the problems in the conventional technology.

In accordance with one aspect of the present invention, an optical amplifier includes: a pumping light source supplying a pumping light to an optical fiber as an amplification medium; an ASE light power detector detecting an ASE light power including an external ASE power flowing from an upstream side outside an amplification signal band; and a control unit setting a gain within the amplification signal band by using the ASE light power detected by the ASE light power detector outside the amplification signal band. The control unit controls the pumping light source by compensating for an influence of the external ASE power, obtained by measuring a relationship between the gain within the amplification signal band and the ASE light power outside the amplification signal band, to set initially the gain within the amplification signal band.

In accordance with another aspect of the present invention, a method of controlling an optical amplifier includes: detecting an ASE light power including an external ASE power flowing from an upstream side outside an amplification signal band; and controlling to set initially a gain within the amplification signal band based on the ASE light power in consideration of an influence of the external ASE power, detected at the detecting, outside the amplification signal band.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a view illustrating a power spectrum when the pumping light is on;

DETAILED DESCRIPTION OF THE PREFERRED EMBODIMENTS

Figure 1:
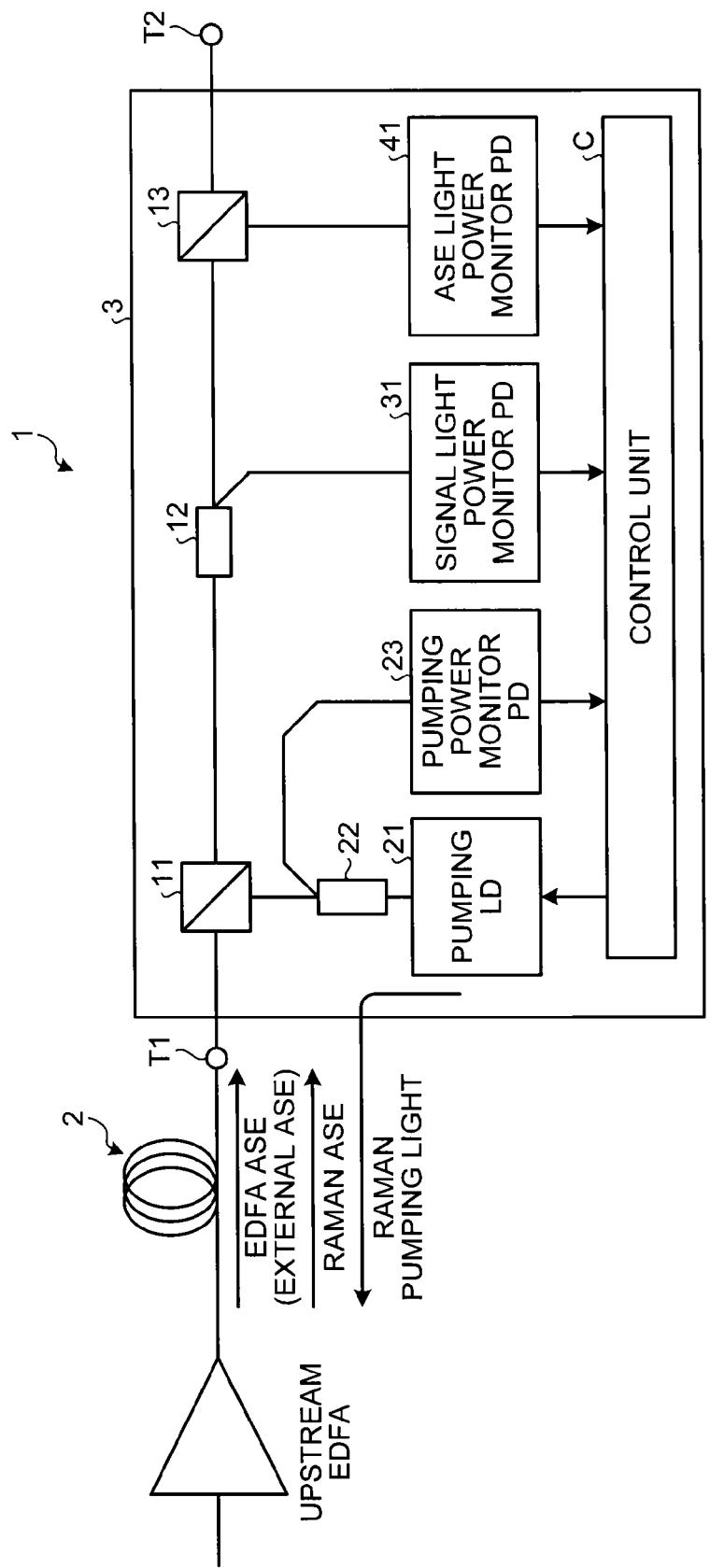
FIG. 1 is a block diagram illustrating a configuration of an optical amplifier according to an embodiment 1 of the present invention.

Hereinafter, embodiments of an optical amplifier and a method of controlling an optical fiber according to the present invention will be described in detail with reference to the drawings. The present invention is not limited to the embodiments.

In a case of controlling a gain by using an ASE light, an ASE light power must be monitored very accurately. However, another optical amplifier such as an EDFA or a Raman amplifier exists at an upstream side of a transmission path of an optical fiber communication. Herein, in an attempt to monitor an ASE light power of one amplifier at the one amplifier itself, the ASE light is detected in a mixed state with an ASE light from another external optical amplifier located at an upstream side. A wavelength at which only the ASE light power is monitored is set outside an amplification signal band.

In an attempt to monitor only the ASE light of the one optical amplifier itself separately, it is necessary to dispose a filter cutting a band which is other than the amplification signal band of the external optical amplifier at the upstream side so that the ASE light of the external optical amplifier does not mix in the ASE light band of the one optical amplifier itself.

In an attempt to monitor only the ASE light of the one optical amplifier itself, it is considered to select different wavelength bandwidths between the ASE light band of the external optical amplifier at the upstream side and the ASE light band of the one optical amplifier itself and to use a filter to monitor only the ASE light power of the one optical amplifier itself or the ASE light power of the external optical amplifier at the upstream side. However, a monitoring optical system is complex.

On the other hand, since an ASE light power generated in accordance with a gain is smaller than optical signal power, an error increases when monitoring the ASE light power of only the one optical amplifier itself. For example, since a PD used in the optical power monitor has a background noise, if an optical power to be monitored is small, an accurate monitoring of the ASE light power is not possible sometimes because the optical power is buried in the background noise. That is, an accuracy of a gain control is sometimes deteriorated in a case of monitoring the ASE light power of the only one optical amplifier itself.

U.S. Patent Application Publication No. 20110141552 discloses conducting an automatic control of a gain of a Raman amplifier by using a relationship between an ASE light power and a pumping light power. For example, there is a problem that an ASE light power (an external ASE power) from another optical amplifier at an upstream side fluctuating for some reason affects the gain, and thus a noise characteristic or tilt variation occurs. Since the external ASE power varies according to systems, there is a problem that system characteristics do not coincide with design values if an actual value of the external ASE power differs from a designed value, for example, when a gain control of an optical amplifier is conducted based on only a relationship between the ASE light power and the pumping light power.

In contrast, the embodiments described below realize a very accurate initial setting of a gain by using a simple monitor detection system.

FIG. 1 is a block diagram illustrating a configuration of an optical amplifier 1 according to an embodiment 1 of the present invention. The optical amplifier 1 is a Raman amplifier. The optical amplifier 1 includes an optical transmission fiber 2 as an amplification medium and an optical amplification controlling unit 3 which is connected to a rear stage of the optical transmission fiber 2 and connected to an input terminal T1 to output an amplified light from an output terminal T2. In the optical amplification controlling unit 3, an optical multiplexer 11, an optical splitter 12, and an optical demultiplexer 13 are connected in this order from a side of the optical transmission fiber 2. The optical demultiplexer 13 is connected to the output terminal T2.

A pumping LD 21 is connected to the optical multiplexer 11 via a splitter 22. When a pumping light is input to the optical multiplexer 11 by the pumping LD 21, the optical multiplexer 11 outputs only a light of a pumping light band to the side of the optical transmission fiber 2 for a backward pumping. When the pumping light is input, the optical transmission fiber 2 outputs an amplified light to the optical multiplexer 11, and the optical multiplexer 11 outputs a light of an amplified light band to the side of the output terminal T2. The pumping light partly split by the optical splitter 22 is monitored by a pumping light power monitor PD 23.

Figure 2:
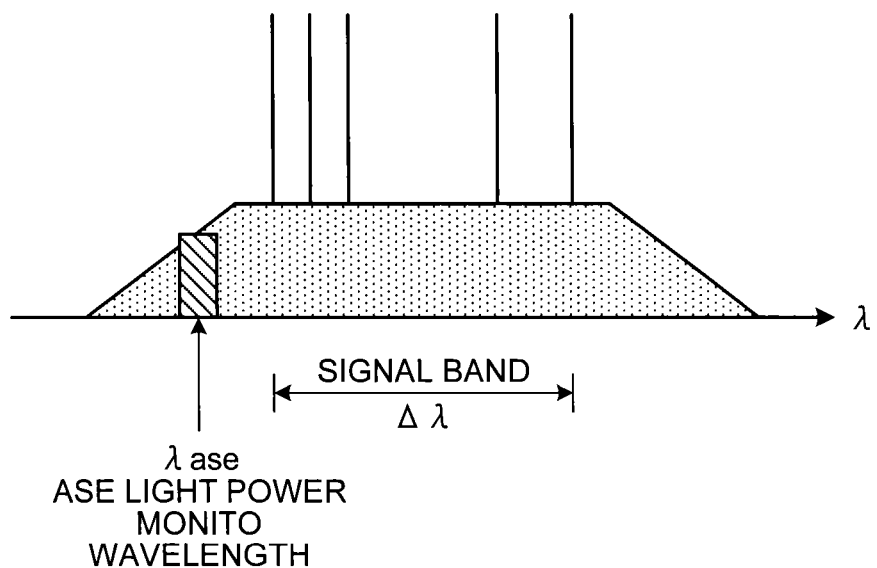
FIG. 2 is a view illustrating a relationship between a signal band including an amplified optical signal and an ASE light band outside the signal band.

The optical splitter 12 splits a part of the amplified light, and an optical power of an entire amplified band of the split amplified light is monitored by an signal light power monitor PD31. The optical demultiplexer 13 outputs an amplified light within a range including a signal wavelength bandwidth to the side of the output terminal T2 and demultiplexes only the ASE light. The demultiplexed ASE light is monitored by an ASE light power monitor PD 41. The optical demultiplexer 13 demultiplexes an ASE light wavelength λase which is other than a signal wavelength band Δλ including an amplified light at the ASE light power monitor PD 41 side as illustrated in FIG. 2. The ASE light illustrated in a trapezoid in FIG. 2 includes an external ASE light flowing from an upstream side (for example, an ASE light or the like output from an EDFA at an upstream side). The ASE light power monitor PD 41 monitors an ASE light at an ASE light wavelength λase including the external ASE light flowing thereinto from the upstream side and an ASE light generated by the optical amplifier 1 itself.

The control unit C controls the pumping light power of the pumping LD 21 based on monitoring results detected by the pumping light power monitor PD 23, the signal light power monitor PD31, and the ASE light power monitor PD 41 respectively to set a gain initially within an amplification signal band. Specifically, a present gain within an amplification signal band is set initially by using a predetermined proportional relationship of the ASE light power detected by the ASE light power monitor PD 41 relative to a gain within an amplification signal band based on an ASE light power detected by the ASE light power monitor PD 41 to compensate for an influence of the external ASE power. To be more specific, an influence of the external ASE power is compensated for by using a predetermined proportional relationship which is effective between the external ASE power outside an amplification signal band and the external ASE power within the amplification signal band and a predetermined proportional relationship which is effective between the ASE power outside the amplification signal band and the ASE power within the amplification signal band when supplying the pumping light.

Regarding a stationary control of the optical amplifier 1 by the control unit after a gain is set initially, various control modes can be used, e.g., controlling the pumping light power of the pumping LD 21 to be constant, controlling an output of the optical amplifier 1 to be constant, and controlling a gain of the optical amplifier 1 to be constant. That is, an accuracy in controlling the gain of the optical amplifier can be increased by the present embodiment.

<Calibration Process 1 of Predetermined Proportional Relationship>

The control unit C sets initially a gain by using only an ASE light power being monitored by the ASE light power monitor PD 41 and including an external ASE power flowing from an upstream side and an ASE light power generated by the optical amplifier 1 itself. Since the above-described predetermined proportional relationship is unique to the optical amplifier 1, the control unit C obtains it by conducting a calibration process in advance. The calibration process is also conducted when the optical amplifier 1 is installed for the first time (in a case of initialization).

Figure 3:
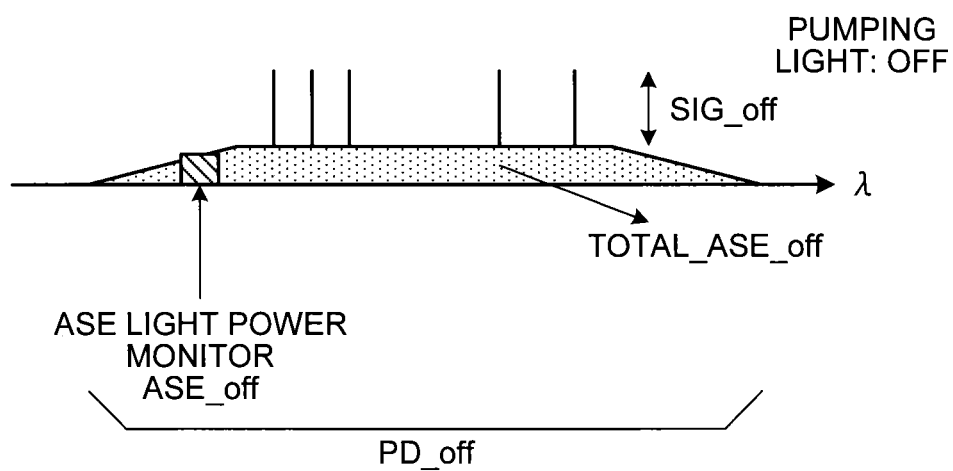
FIG. 3 is a view illustrating a power spectrum when a pumping light is off.

At first, an output of a pumping light from the pumping LD 21 is off in a state where a optical signal is input from outside to the optical amplifier 1. In a case where the output of the pumping light is off, an optical signal from an upstream and an ASE light (external ASE light) from an optical amplifier at an upstream side are input to the optical amplifier 1. When the pumping light is off, an ASE light power in total band is obtained, i.e., TOTAL_ASE_off [mW]=f_off (ASE_off)

where, as illustrated in FIG. 3, PD off [mW] is a value monitored by the optical signal power monitor PD31 monitoring an optical power in total band and ASE_off [mW] is a value monitored by the ASE light power monitor PD 41 monitoring the ASE light power at a wavelength λase outside the signal band. Herein f_off is a known function converting the ASE light power monitor value outside the signal band, monitored by the ASE light power monitor PD 41 when the pumping light is off, to the total band ASE optical power. The function can be obtained based on a result of measuring an ASE light power at a wavelength λase outside the signal band and the total band ASE optical power when the pumping light is off by a measuring instrument such as an optical spectrum analyzer in a system in which the optical amplifier 1 of the present embodiment is connected with a reference EDFA and optical transmission fiber. It is indisputable that the function may be obtained by other methods.

On the other hand, an optical signal power SIG_off [mW] can be obtained by subtracting total band ASE optical power TOTAL_ASE_off from total band optical power monitor PD_off, e.g., SIG_off=(PD_off)−(TOTAL_ASE_off).

Figure 4:
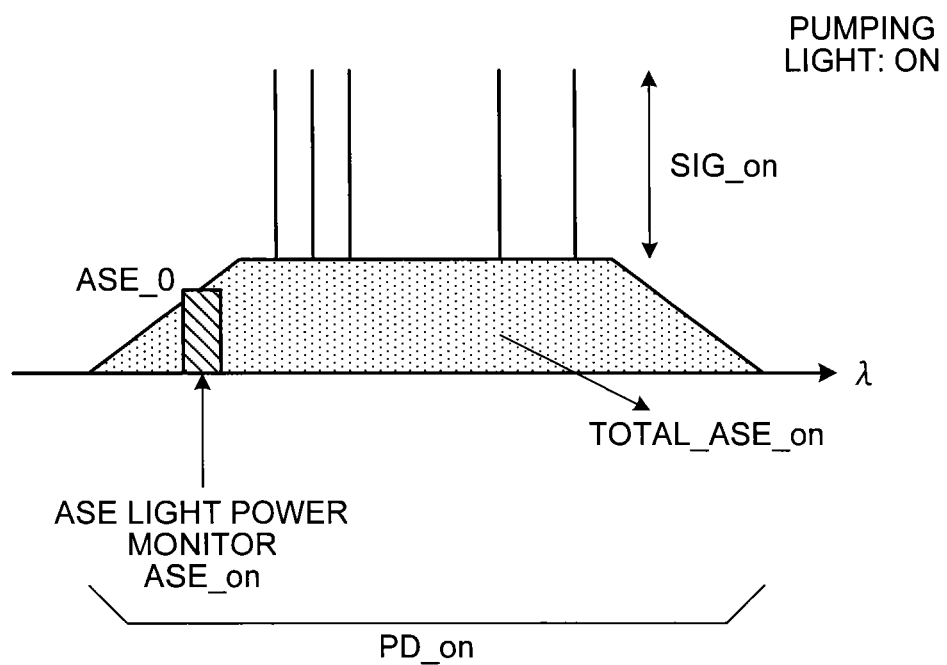

After that, an output of the pumping light is on. In a case where the output of the pumping light is on, an amplified optical signal, an amplified ASE light from an optical amplifier disposed upstream, and an ASE light of the optical amplifier 1 itself are input at the optical amplifier 1 as illustrated in FIG. 4. When the pumping light is on, the total band ASE optical power TOTAL_ASE_on [mW] is obtained i.e., TOTAL_ASE_on=f_on (ASE_on)

where, as illustrated in FIG. 4, PD_on [mW] is a value monitored by the optical signal power monitor PD31 and ASE_on [mW] is a value monitored by the ASE light power monitor PD 41. Herein f_on is a known function converting the ASE light power monitor value outside the signal band, monitored by the ASE light power monitor PD 41 when the pumping light is on, to the total band ASE optical power. The function can be obtained based on a result of measuring an ASE light power at a wavelength λase outside the signal band and the total band ASE optical power when a predetermined output of the pumping light is on by a measuring instrument such as an optical spectrum analyzer in a system in which the optical amplifier 1 of the present embodiment is connected with a reference EDFA and optical transmission fiber. An output when the pumping light is on can be varied appropriately to obtain a plurality of relationships and to obtain a function corresponding to the pumping light power. It is indisputable that the function may be obtained by other methods.

On the other hand, an optical signal power SIG_on [mW] can be obtained by subtracting total band ASE optical power TOTAL_ASE_on from total band optical power monitor PD_on, i.e., SIG_on=(PD_on)−(TOTAL_ASE_on).

As a result of this, a monitor gain GAIN_0 [dB] is indicated below as a ratio of a logarithmic conversion of an optical signal power when the pumping light is on relative to a logarithmic conversion of an optical signal power when the pumping light is off, i.e., GAIN_0=10(log(SIG_on)−log(SIG_off)). ASE_0 is a logarithmic conversion of an outside-the-signal-band ASE light power ASE_on in dB below when the pumping light is on, i.e., ASE_0=10 log(ASE_on).

Figure 5:
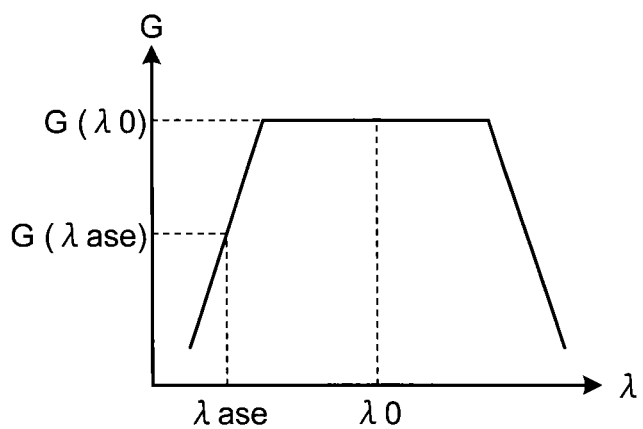
FIG. 5 is a view illustrating a relationship between a gain of a Raman amplifier and an ASE light power.

Herein a gain and an ASE light power of a Raman amplifier is proportional as illustrated in FIG. 5. It is, Pase_raman=$K \times G(\lambda ase)$ where Pase_raman [mW] is an ASE light power by the Raman amplifier itself, λase [nm] is a monitor wavelength of the ASE light power outside the signal band, and G (λase) [mW/mW] is a Raman gain at a wavelength λase. Herein K is a proportional constant for the ASE light power outside the signal band and the gain by the Raman amplifier. On the other hand, the ASE light power of the optical amplifier at an upstream side is amplified by the Raman gain G (λase) at the wavelength λase where Pase_edfa [mW] is an ASE light power by the optical amplifier at the upstream side. Therefore, an ASE light power Pase [mW] monitored at the Raman amplifier at the wavelength outside the signal band is indicated as, Pase=Pase_edfa$\times G(\lambda ase)+K \times G(\lambda ase)$.

This equation is modified to

Pase=(Pase_edfa+$K) \times G(\lambda ase)$.

A logarithmic conversion of this modified equation is, log(Pase)=log((Pase_edfa+$K$))+log($G(\lambda ase)$) [dBm]  (1)

On the other hand, a gain G (λ0) [mW/mW] at an optical signal wavelength λ0 and a gain G (λase) [mW/mW] at a monitor wavelength λase of the ASE light power are in a relationship below.

$$\log(G(\lambda ase)) = \log(G(\lambda 0)) \times CONV \ [dB] \quad (2)$$

Herein an equation of $$\log(Pase) = \log(P\_edfa + K) + \log(G(\lambda 0)) \times CONV \ [dBm]$$

is obtained by substituting the equation (2) for the equation (1)

When the above equation is substituted by $$\log(Pase) = ASE\_0 \ [dBm],$$

$$\log(P\_edfa + K) = X \ [dBm], \text{ and}$$

$$\log(G(\lambda 0)) = GAIN\_0 \ [dB],$$

an equation (3) is obtained.

$$ASE\_0 = [91]GAIN\_0 \times CONV + X \quad (3)$$

That is, a predetermined proportional relationship shown in the equation (3) is obtained. In the equation (3), X is a value indicating an influence of an external ASE light and indicates that, if a gain is controlled only based on a relationship between ASE_0 and GAIN_0, an actual gain is shifted from a target value by an influence of the external ASE light. Therefore, a conventionally unachievable very accurate gain-setting is possible by using the relationship of the equation (3) to set initially a gain.

Figure 6:
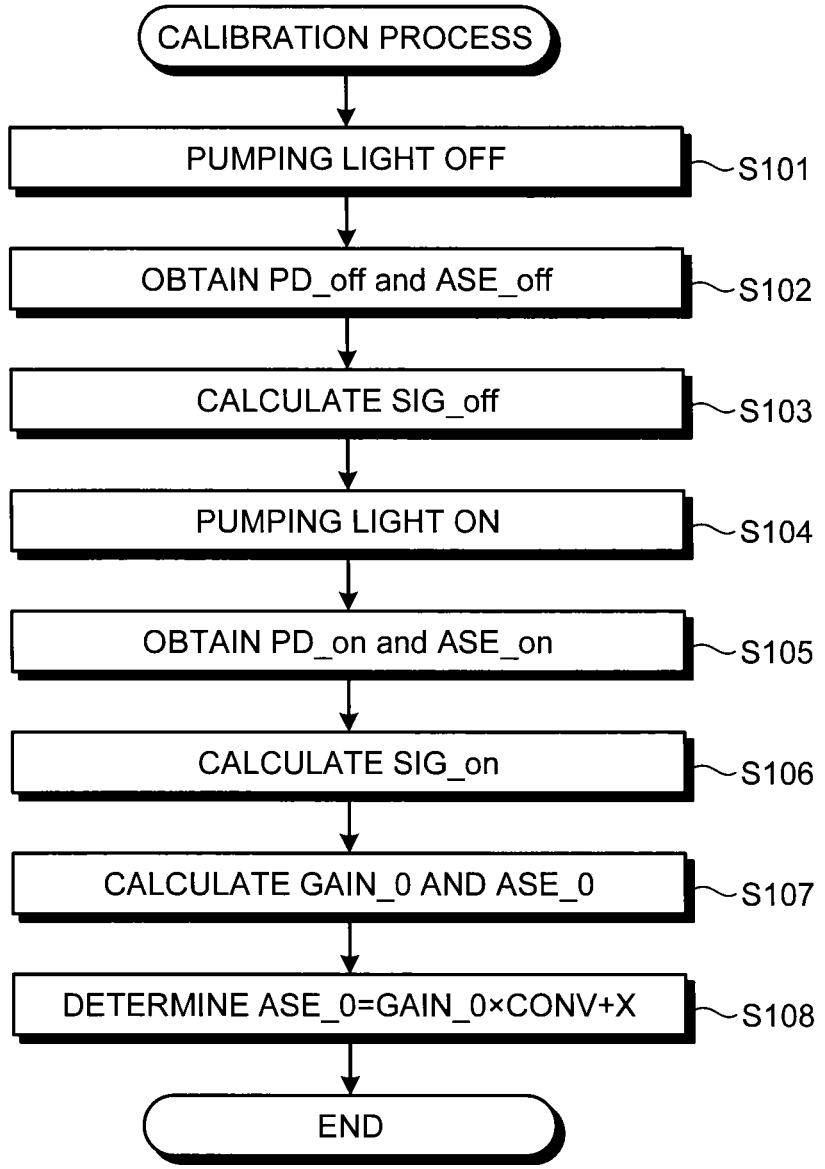
FIG. 6 is a flowchart showing steps of a calibration process for a predetermined proportional relationship.

A calibration process compensating for the relationship of the equation (3) in advance is conducted by steps shown in a flowchart shown in FIG. 6 based on the above described concept. That is, at first, the control unit C turns off an output of a pumping light from the pumping LD 21 in a state where an optical signal is input from an amplifier at an upstream side to the control unit C (step S101). After that, the control unit C obtains a PD_off monitored by the optical signal power monitor PD31 and an ASE_off monitored by the ASE light power monitor PD 41 (step S102). Then the control unit C obtains a TOTAL_ASE_off from TOTAL_ASE_off=f_off(ASE_off) to calculate a gain SIG_off when the pumping light is off based on a ratio of the PD_off relative to the TOTAL_ASE_off (step S103).

After that, the control unit C turns on the pumping light (step S104) and obtains a PD_on monitored by the optical signal power monitor PD31 and an ASE_on monitored by the ASE light power monitor PD 41 (step S105). Then the control unit C obtains a TOTAL_ASE_on from TOTAL_ASE_on=f_on(ASE_on) to calculate a gain SIG_on when the pumping light is on based on a ratio of the PD_on relative to the TOTAL_ASE_on (step S106).

After that, the control unit C calculates a GAIN_0 and an ASE_0 based on GAIN_0=10(log(SIG_on)−log(SIG_off)) and ASE_0=10 log(ASE_on)(step S107).

After that, since the GAIN_0 and the ASE_0 are obtained and CONV of the equation (3) is a known value, X of the equation (3) is determined, and finally the relationship of the equation (3), i.e., ASE_0=GAIN_0×CONV+X is determined (step S108). Since the constant CONV is a known value, X of the equation (3) may be obtained by using the GAIN_0 and the ASE_0 as a variable and the X may be maintained as a calibration result. Alternatively, X of the equation (3) may not be obtained and both of the GAIN_0 and the ASE_0 (a pair of values) may be maintained as calibration results. In summary, the relationship of the equation (3), in which the proportionality coefficient CONV is defined in the known equation (2), may only have to be specified. A gain can be set initially very accurately by using the relationship of the equation (3). That is, accuracy in controlling the gain of the optical amplifier can be increased by the present embodiment.

Regarding a stationary control of the optical amplifier by the control unit after a gain is set initially, various control modes can be used as described above, e.g., controlling the pumping light power of the pumping LD to be constant, controlling an output of the optical amplifier to be constant, and controlling a gain of the optical amplifier to be constant.

<Initial Setting of Gain 1>

Figure 7:
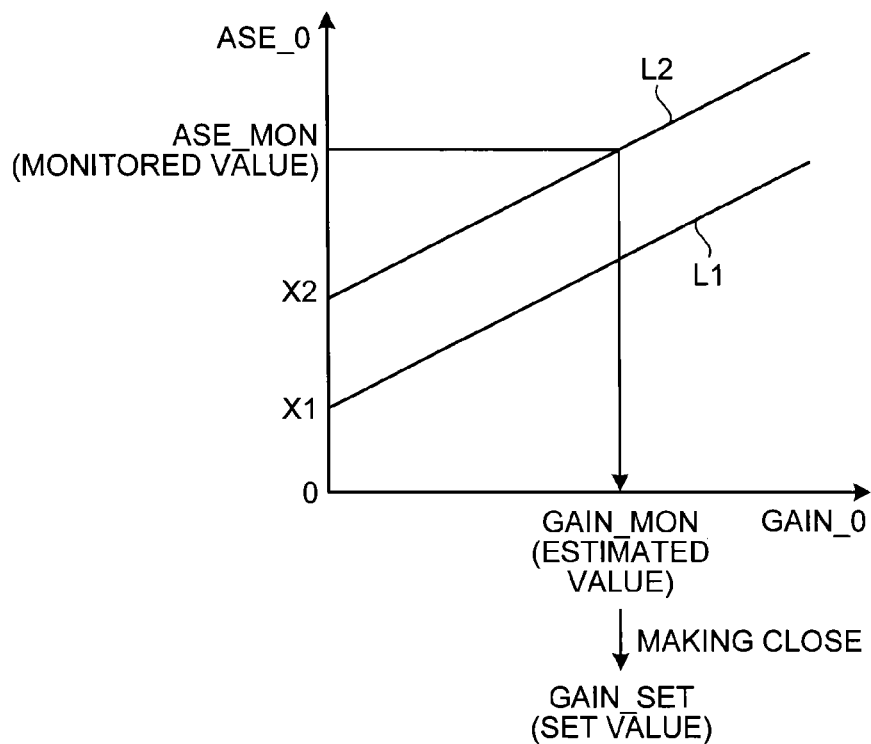
FIG. 7 is a view explaining a control in which a gain is set initially by estimating a gain from an ASE light power monitor value and making the estimated gain close to a target gain in a case where X is maintained as a calibration result.

The control unit C set initially a gain by using the specified equation (3). As illustrated in FIG. 7, in a case where X is maintained as a calibration result, the GAIN_0 and the ASE_0 are variables. If X is X1, a line L1 is specified. If X is X2, a line L2 is specified. Consider herein a case in which the line L2 is specified and GAIN_SET is a set target gain. In a case where a monitored value of the ASE light power monitor PD 41 when being controlled at a certain gain is ASE_MON, the line L2 is used to substitute the ASE_MON for the variable ASE_0 to estimate a gain GAIN_MON, and set initially a gain by controlling an output of the pumping light so that the estimated gain GAIN_MON is close to the set target gain GAIN_SET.

<Initial Setting of Gain 2>

In a case where the GAIN_0 and the ASE_0 are maintained as calibration results, the control unit C controls as follows. That is, the above-described equation (3) is, $$ASE\_0 = GAIN\_0 \times CONV + X.$$

When being controlled at a certain gain, a relationship between a monitored gain GAIN_MON and a monitored value ASE_MON of the ASE light power monitor PD 41 in this state is, $$ASE\_MON = GAIN\_MON \times CONV + X \quad (4).$$

Based on the equations (3) and (4), the monitored gain GAIN_MON can be represented as, $$GAIN\_MON = GAIN\_0 + (ASE\_MON - ASE\_0)/CONV.$$

Figure 8:
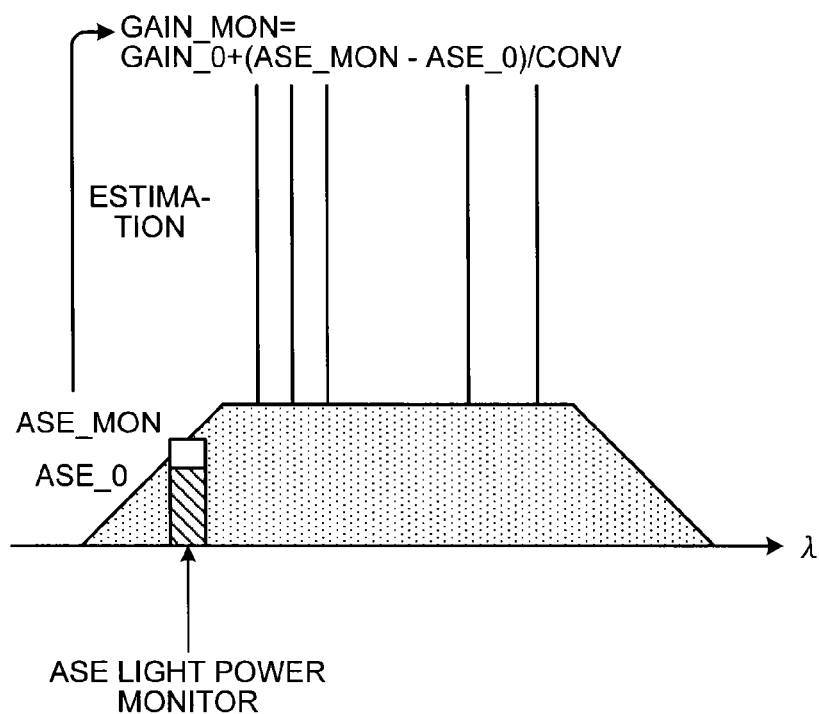
FIG. 8 is a view explaining a control in which a gain is set initially by estimating a gain from an ASE light power monitor value and making the estimated gain close to a target gain in a case where GAIN_0 and ASE_0 are maintained as calibration results.

In the equation, the GAIN_0, the ASE_0, and CONV are known values, and the ASE_MON is a monitored value of the ASE light power monitor PD 41. Therefore, when a set target gain is GAIN_SET, conducting a feedback control of an output of the pumping light so that the gain GAIN_MON is close to the target gain GAIN_SET as illustrated in FIG. 8 causes the monitored value ASE_MON to change and enables a gain to be set initially at the set target gain GAIN_SET.

<Initial Setting of Gain 3>

Figure 9:
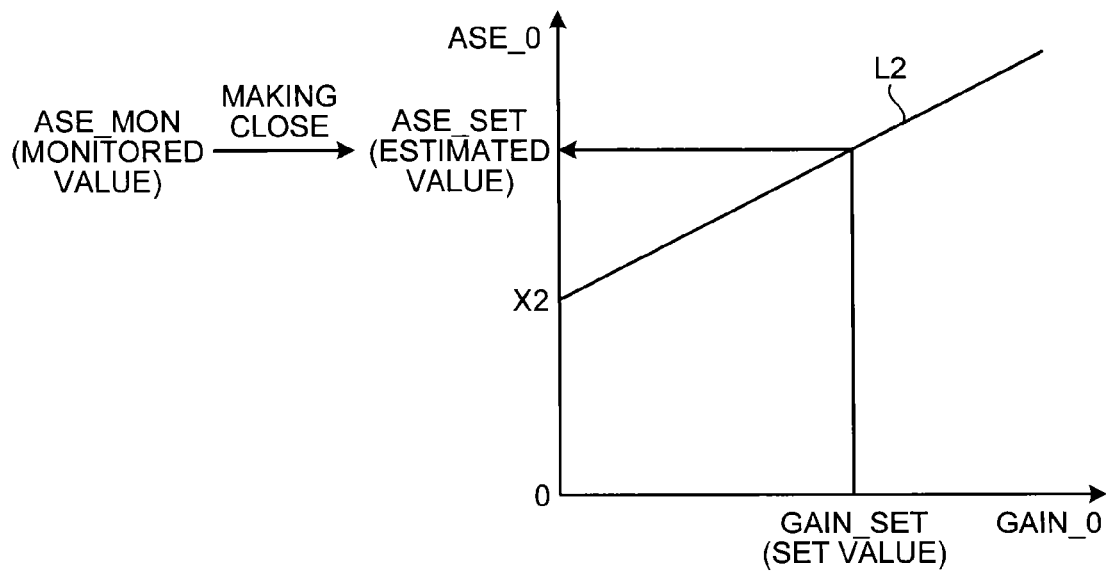
FIG. 9 is a view explaining a control in which a gain is set initially by estimating a an ASE light power monitor value from a previously set target gain and making an actual ASE light power monitor value close to the estimated ASE light power monitor value in a case where X is maintained as a calibration result.

Although GAIN_MON is made close to the GAIN_SET in gain controls in the above-described Initial settings of gain 1 and 2, in a case where the target gain GAIN_SET is set as illustrated in FIG. 9, an ASE_SET is estimated from the equation (4). Then, making the ASE_MON, which is a monitored value of the ASE light power monitor PD 41, close to the estimated gain ASE_SET allows a gain to be set initially. FIG. 9 shows a case where X=X2 is maintained as a calibration result and the line L2 is specified.

<Initial Setting of Gain 4>

Figure 10:
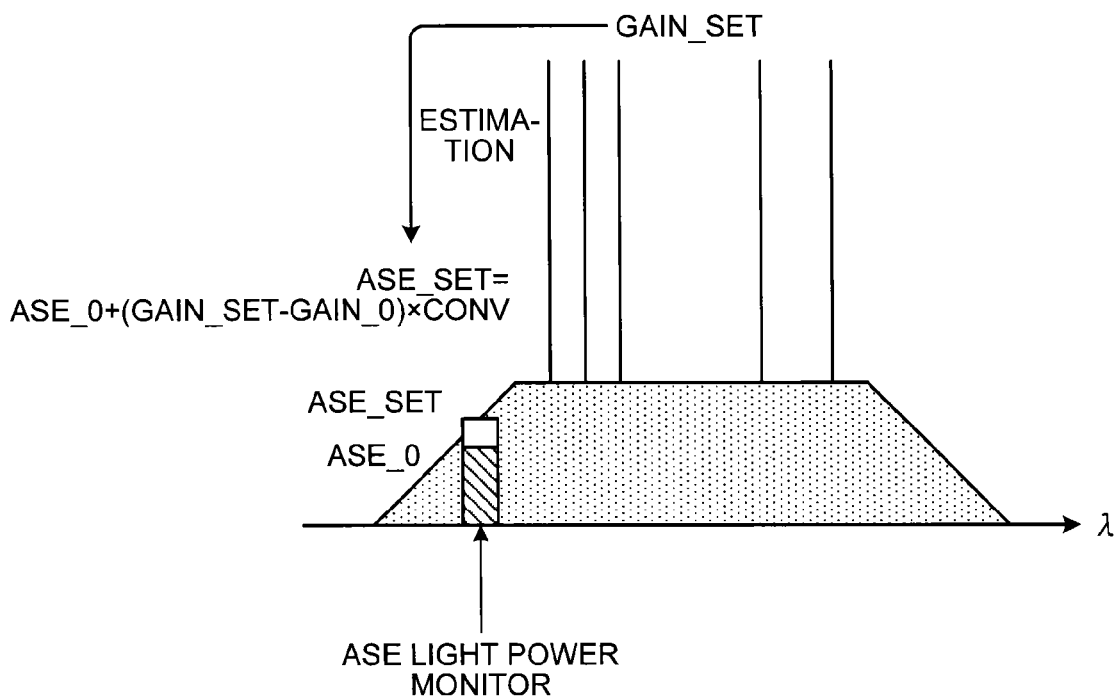
FIG. 10 is a view explaining a control in which a gain is set initially by estimating an ASE light power monitor value from a previously set target gain and making the actual ASE light power monitor value close to the estimated ASE light power monitor value in a case where GAIN_0 and ASE_0 are maintained as calibration results.

A gain can be set initially in a case where the GAIN_0 and the ASE_0 are maintained as calibration results similarly to the above-described initial setting of gain 2 as illustrated in FIG. 10. That is, in a case where a set target gain is GAIN_SET, an estimated ASE value ASE_SET in this state can be represented by an equation (5).

$$ASE\_SET = GAIN\_SET \times CONV + X \quad (5)$$

Therefore, the estimated ASE value ASE_SET can be represented as below from the equations (3) and (5).

ASE_SET=ASE_0+(GAIN_SET−GAIN_0)×CONV

Since, in this equation, the GAIN_0, the ASE_0, and the CONV are known values and a GAIN_SET is set, it can be estimated that an estimated monitored value of the ASE light power monitor PD 41 in this state is ASE_SET. Therefore, when a set target gain is GAIN_SET, conducting a feedback control of the pumping light so that the actual monitor value ASE_MON is close to the estimated ASE value ASE_SET as illustrated in FIG. 10 enables a gain to be set initially.

A gain can be set initially in the present embodiment 1 by allowing a predetermined proportional relationship of which proportionality coefficient as shown in the equation (3) is the same to be specified by calibration, estimating a gain from a value obtained by merely monitoring a power of an ASE light including another ASE light from an upstream side based on a result of the calibration, and controlling the pumping light so that the estimated gain becomes a target gain. In addition, a gain can be set initially by estimating a monitored value of an ASE light power corresponding to the target gain based on the calibration result and controlling the pumping light so that an actual monitor value becomes the estimated monitored value. An influence of the external ASE power is thus compensated for, and a very accurate initial setting of a gain is possible.

Specifically, since an ASE light power of itself and another ASE light power from an upstream side in a mixed state in which the other ASE light power is not separated from the ASE light power of itself are detected by only the ASE light power monitor PD 41 in the present embodiment 1, a gain can be set initially by a simple monitor detection system. In addition, since a greater optical power in which the ASE light power of itself is mixed with the other ASE light power can be detected, a more accurate initial setting of a gain is possible than in a case of detecting only the smaller ASE light power of itself because the detected ASE light power is prevented from being buried in a background noise of the ASE light power monitor PD 41.

Although a case of using one pumping light is explained in the above-described embodiment 1, a case of initial setting of a gain by using a plurality of pumping lights for improving of flatness of a gain or the like is explained in the present embodiment 2. As previously described, regarding a stationary control of the optical amplifier by the control unit after a gain is set initially, various control modes can be used, e.g., controlling the pumping light power of the pumping LD to be constant, controlling an output of the optical amplifier to be constant, and controlling a gain of the optical amplifier to be constant.

Figure 11:
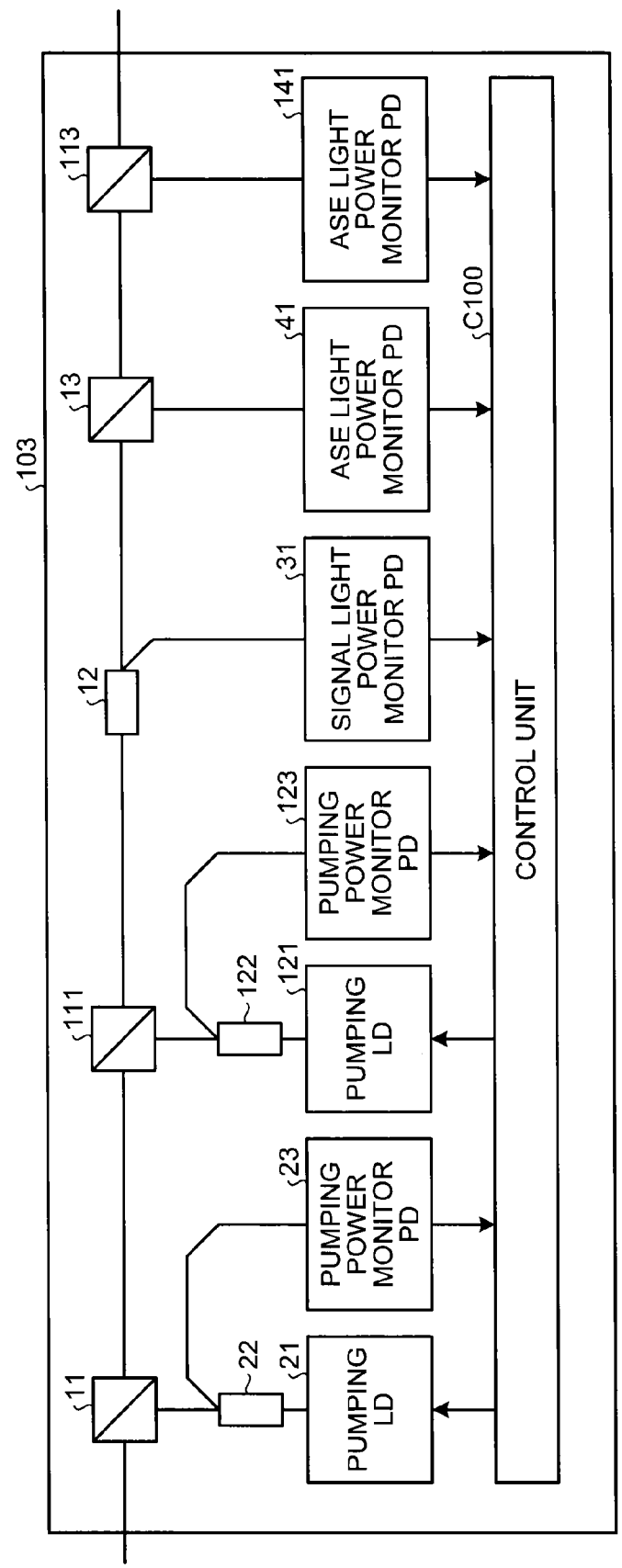
FIG. 11 is a block diagram illustrating a configuration of an optical amplification controlling unit in an optical amplifier according to an embodiment 2 of the present invention.

FIG. 11 is a block diagram illustrating a configuration of an optical amplification controlling unit according to an embodiment 2 of the present invention. As illustrated in FIG. 11, in the optical amplification controlling unit 103, an optical multiplexer 111 and an optical demultiplexer 113 corresponding to the optical multiplexer 11 and the optical demultiplexer 13 respectively are additionally disposed in the configuration of the embodiment 1. An optical splitter 122, a pumping LD 121, and a pumping power monitor PD 123 corresponding to the optical splitter 22, the pumping LD 21, and the pumping power monitor PD 23 respectively and being connected to the optical multiplexer 11 are additionally disposed and connected to the optical multiplexer 111. An ASE light power monitor PD 141 corresponding to the ASE light power monitor PD 41 connected to the optical demultiplexer 13 is additionally disposed and connected to the optical demultiplexer 113. A control unit C100 corresponding to the control unit C sets initially a gain by controlling pumping light powers of the pumping LDs 21 and 121 based on ASE light powers detected by the ASE light power monitor PDs 41 and 141. Wavelengths of pumping lights emitted by the pumping LD 21 and the pumping LD 121 are different. Therefore, wavelengths demultiplexed by the optical multiplexers 11 and 111 are different. Furthermore, wavelengths of the ASE lights detected by the ASE light power monitor PD 41 and the ASE light power monitor PD 141 are different. Therefore, wavelengths demultiplexed by the optical demultiplexers 13 and 113 are different. The ASE lights detected by the ASE light power monitor PD 41 and the ASE light power monitor PD 141 are detected at wavelength ranges not overlapping with each other substantially.

<Calibration Process 2 of Predetermined Proportional Relationship>

Figure 12:
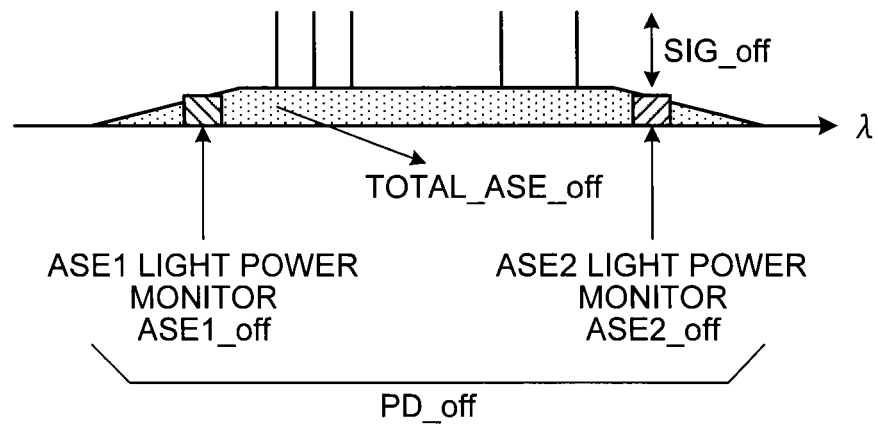
FIG. 12 is a view illustrating a relationship between a signal band including an amplified optical signal and two ASE light bands outside the signal band.

Calibration data corresponding to the equation (3) are also generated in the embodiment 2. At first, all the outputs of the pumping lights from the pumping LDs 21 and 121 are off in a state where an optical signal is input to the optical amplifier 1 from outside. When the pumping lights are off, a TOTAL_ASE_off [mW] of the ASE light power of total band is obtained i.e., TOTAL_ASE_off=$f1\_off$(ASE1_off)+$f2\_off$(ASE2_off)

where, as illustrated in FIG. 12, a PD off [mW] is a value monitored by the optical signal power monitor PD31 monitoring optical powers in total band, an ASE1_off [mW] is a value monitored by the ASE light power monitor PD 41 monitoring an ASE light power at a wavelength $\lambda ase1$ outside the signal band, and an ASE2_off [mW] is a value monitored by the ASE light power monitor PD 141 monitoring an ASE light power at a wavelength $\lambda ase2$ outside the signal band. Herein the f1_off and the f2_off are known functions by which the ASE light power monitor value outside the signal band monitored by the ASE light power monitor PD 141 is converted to a total band ASE optical power when the pumping light is off. The function can be obtained similarly to the f_off of the embodiment 1.

On the other hand, an optical signal power SIG_off [mW] is obtained by subtracting the total band ASE optical power TOTAL ASE off from the total band optical power monitor PD off similarly to the embodiment 1. Specifically, it is SIG_off=(PD_off)−(TOTAL_ASE_off).

Figure 13:
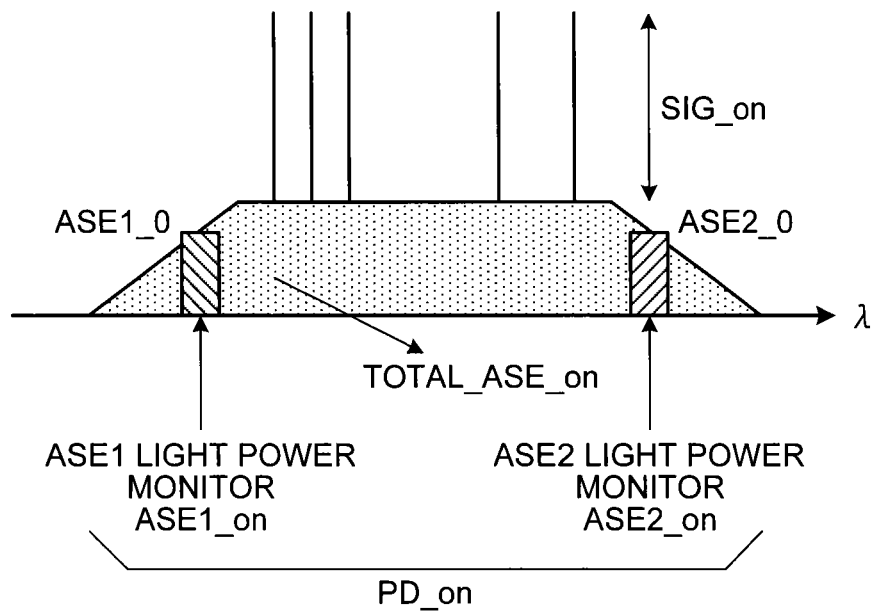
FIG. 13 is a view illustrating a power spectrum when a pumping light is off and when calibration is conducted by a control unit according to the embodiment 2 of the present invention.

After that, all the outputs of the pumping lights are on. In a case where the outputs of the pumping lights are on, an amplified optical signal, an amplified ASE light from an optical amplifier at an upstream, and an ASE light of the optical amplifier 1 itself are input at the optical amplifier 1 as illustrated in FIG. 13. When the pumping lights are on, a total band ASE optical power TOTAL_ASE_on [mW] is obtained a TOTAL_ASE_on=$f1_{on}$(ASE1_on)+$f2\_on$(ASE2_on)

where, as illustrated in FIG. 13, a PD on [mW] is a value monitored by the optical signal power monitor PD31, an ASE1_on [mW] is a value monitored by the ASE light power monitor PD 41, and an ASE2_on [mW] is a value monitored by the ASE light power monitor PD 141. Herein the f1_on and the f2_on are known functions by which the ASE light power monitor value outside the signal band monitored by the ASE light power monitor PD 141 is converted to a total band ASE optical power when the pumping lights are on. The function can be obtained similarly to the f_on of the embodiment 1.

On the other hand, the optical signal power SIG_on [mW] is obtained by subtracting the total band ASE optical power TOTAL_ASE_on from the total band optical power monitor PD_on. Specifically, it is $$SIG\_on=(PD\_on)-(TOTAL\_ASE\_on).$$

As a result of this, the monitor gain GAIN_0 [dB] is a ratio of a logarithmic conversion of an optical signal power when the pumping lights are on relative to a logarithmic conversion of the optical signal power when the pumping lights are off and indicated as follows.

$$GAIN\_0=10(\log(SIG\_on)-\log(SIG\_off))$$

Values ASE1_0 and ASE2_0 below are logarithmic conversions of ASE1_on and the ASE2_on outside the signal band of the ASE light powers in dB when the pumping lights are on.

$$ASE1\_0=10\log(ASE1\_on)$$

$$ASE2\_0=10\log(ASE2\_on)$$

As a result, two proportional relationships below can be obtained.

$$ASE1\_0=GAIN\_0\times CONV1+X$$

$$ASE2\_0=GAIN\_0\times CONV2+X$$

In a case where the number of the pumping lights are n of equal to or larger than 3, the proportional relationships can be obtained in n in number and can be generalized to an equation of $$ASEn\_0=GAIN\_0\times CONVn+X.$$

The CONVn is a known value obtained from a relational expression which is similar to the above-described equation (2) and indicates a ratio of a gain in the signal band and a gain value in each ASE light power monitor wavelength band.

<Initial Setting Of Gain 5>

Figure 14:
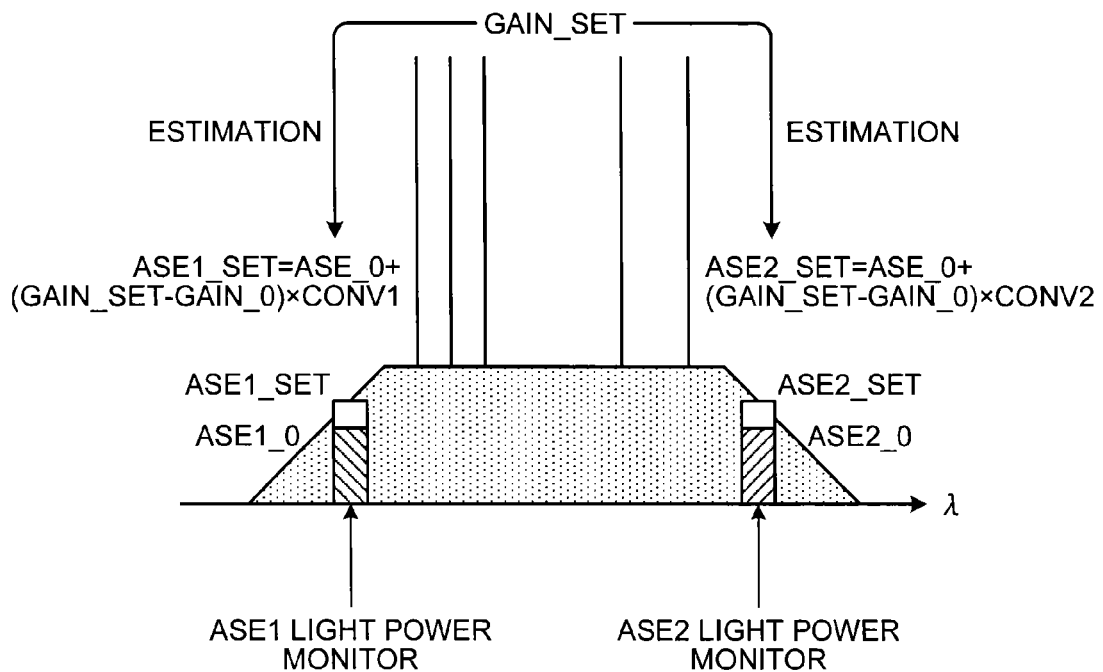
FIG. 14 is a view illustrating a power spectrum and a control in which a gain is set initially when the pumping light is on and when a calibration is conducted by the control unit according to the embodiment 2 of the present invention.

In a case of outputting a plurality of pumping lights, a gain can be set initially based on calibration results as illustrated in FIG. 14. Although an initial setting of gain herein will be explained similarly to the initial setting of gain 4, an initial setting of gain can be conducted similarly in other ways.

Although FIG. 14 shows a case of outputting two pumping lights, herein a case of outputting a plurality of (n of) pumping lights will be explained. At first, as calibration data, a proportional relationship between each ASE light power and a gain by a plurality of pumping lights is $$ASEn\_0=GAIN\_0\times CONVn+X$$

as described above. Herein, in a case where a target gain is GAIN_SET, in a relationship between a gain by a plurality of pumping lights and each ASE light power, a certain monitored value, i.e., ASEn_SET of a ASE light power can be represented by using the equation as $$ASEn\_SET=GAIN\_SET\times CONVn+X.$$

Therefore, the estimated ASE value ASEn_SET can be represented as $$ASEn\_SET=ASEn\_0+(GAIN\_SET-GAIN\_0)\times CONVn.$$

Since, in this equation, the GAIN_0, the ASE_0, and the CONV are known values and a GAINn_SET is set, it can be estimated that an estimated monitored value of the ASE light power is estimated to be ASEn_SET. Therefore, when a set target gain is GAIN_SET, conducting a feedback control of the pumping light so that the actual monitor value ASEn_MON is close to the estimated ASE value ASEn_SET enables a gain to be set initially. For example, in a case of two pumping lights as illustrated in FIG. 14, conducting a feedback control of each pumping light so that the actual monitor values ASE1_MON and ASE2_MON are close to the estimated ASE values of ASE1_SET and ASE2_set enables a gain to be set initially.

In the embodiment 2, calibration data can be obtained similarly to the embodiment 1 even in a case of amplification by a plurality of pumping lights to set initially a gain based on the calibration data.

Since each of ASE light powers of themselves and another ASE light power from an upstream side in a mixed state in which the other ASE light power is not separated from each of the ASE light powers of themselves is detected by providing ASE light power monitor PDs corresponding to the pumping lights respectively, a gain can be set initially by a simple monitor detection system. In addition, since a greater optical power in which each of the ASE light powers of themselves is mixed with the other ASE light power can be detected, a more accurate initial setting of a gain is possible than in a case of detecting only the smaller ASE light powers of themselves because the detected ASE light power is prevented from being buried in a background noise of the ASE light power monitor PD 41.

Although a gain is set initially in an embodiment 3 similarly to the above-described embodiments 1 and 2, a tilt can be also controlled which is a difference between a gain at a shorter wavelength side and a gain at a longer wavelength side. In this case, a gain is set initially by using a plurality of pumping lights and a calibration is conducted by using the plurality of pumping lights similarly to the embodiment 2. In this case, the pumping light powers when the pumping lights are on are set so that the tilt is 0 [dB]. Then a proportional relationship between the gain and each ASE light power is obtained. As a result of this, equations below are obtained similarly to the embodiment 2 in a case of two pumping lights.

$$ASE1\_0=GAIN\_0\times CONV1+X$$

$$ASE2\_0=GAIN\_0\times CONV2+X$$

In this case, changes in the respective ASE powers in a case where the target gain GAIN_SET is set are represented below.

$$(GAIN\_SET-GAIN\_0)\times CONV1$$

$$(GAIN\_SET-GAIN\_0)\times CONV2$$

Changes in the respective ASE powers in a case where a target tilt is set as TILT_SET are represented below.

$$F1(GAIN\_SET)\times TILT\_SET$$

$$F2(GAIN\_SET)\times TILT\_SET$$

Herein F1(GAIN_SET) and F2(GAIN_SET) are known functions converting a tilt changing portion and an ASE power changing portion in the respective ASE-monitoring-wavelength bands and depending on a gain. The functions can be obtained by measurement or the like similarly to the f_off and the f_on of the embodiment 1.

Figure 15:
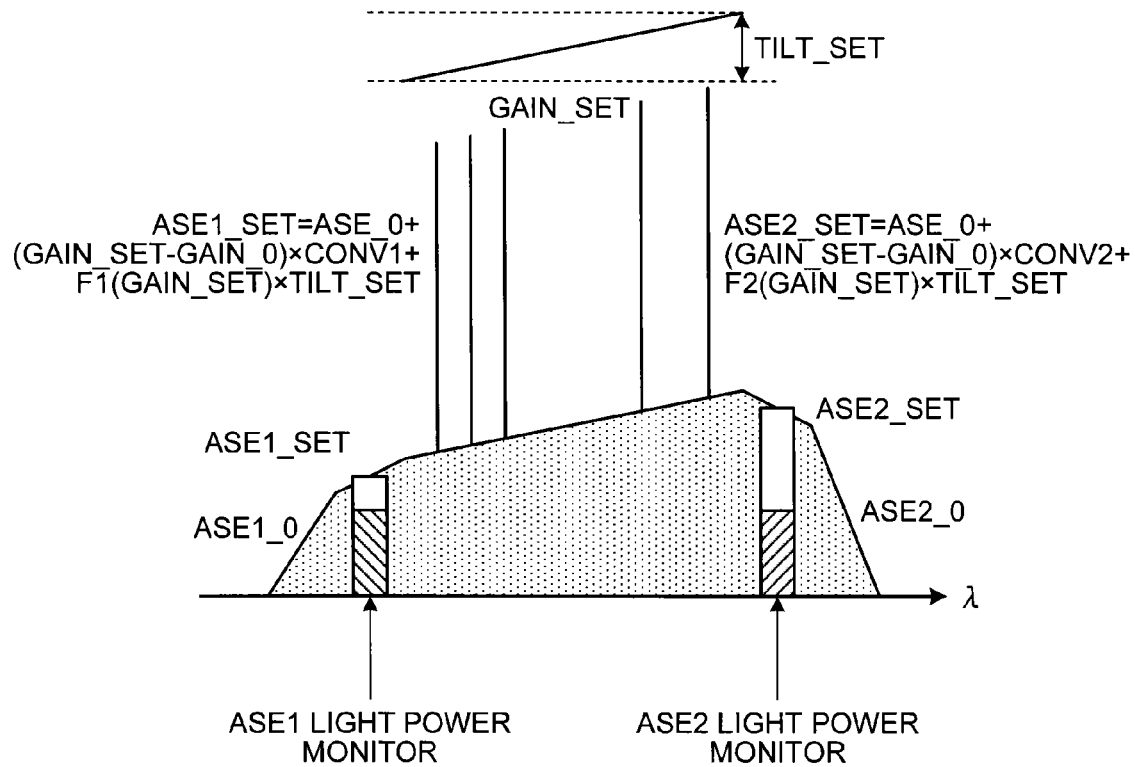
FIG. 15 is a power spectrum diagram for explaining a control in which a gain and a tilt are set initially according to an embodiment 3 of the present invention.

Therefore, as illustrated in FIG. 15, initial setting of the target tilt and the target gain are possible by controlling the respective ASE light powers to values of ASE1_SET and ASE2_SET represented as follows.

$$ASE1\_SET=ASE\_0+(GAIN\_SET-GAIN\_0)\times CONV1+F1(GAIN\_SET)\times TILT\_SET$$

$$ASE2\_SET=ASE\_0+(GAIN\_SET-GAIN\_0)\times CONV2+F2(GAIN\_SET)\times TILT\_SET$$

Then, a gain and a tilt can be set initially by conducting feedback controls of the respective pumping lights so that the actual monitor values of ASE, i.e., ASE1_MON and ASE2_MON are close to estimated ASE values ASE1_SET and ASE2_SET respectively.

In a case where the number of pumping lights is equal to or larger than n, a more accurate initial setting of a tilt can be performed by controlling a ratio among the ASE light powers depending on an interval ratio of wavelengths of the respective ASE lights.

The above-described embodiment 3 is configured to set initially a gain and a tilt by controlling the respective pumping lights independently. An embodiment 4 is configured to use one calibration datum to control the rest of pumping lights.

At first, a calibration is performed by using a plurality of pumping lights similarly to the embodiment 3. A pumping light power in this state is set so that a tilt is 0 [dB] as a pumping light output power when a pumping light is on. After that, a proportional relationship of one pumping light with a gain and an ASE light power are obtained.

$$ASE1\_0=GAIN\_0 \times CONV1+X$$

A change in an ASE power in a case where a target gain corresponding to this pumping light is set to GAIN_SET is $$(GAIN\_SET-GAIN\_0) \times CONV1.$$

A change in each ASE power in a case where a target tilt is set to TILT_SET is $$F1(GAIN\_SET) \times TILT\_SET.$$

Herein F1(GAIN_SET) is a known function converting a tilt changing portion and an ASE power changing portion in one ASE-monitoring-wavelength band and depending on a gain. The function can be obtained by measurement or the like similarly to the f_off and the f_on of the embodiment 1.

Figure 16:
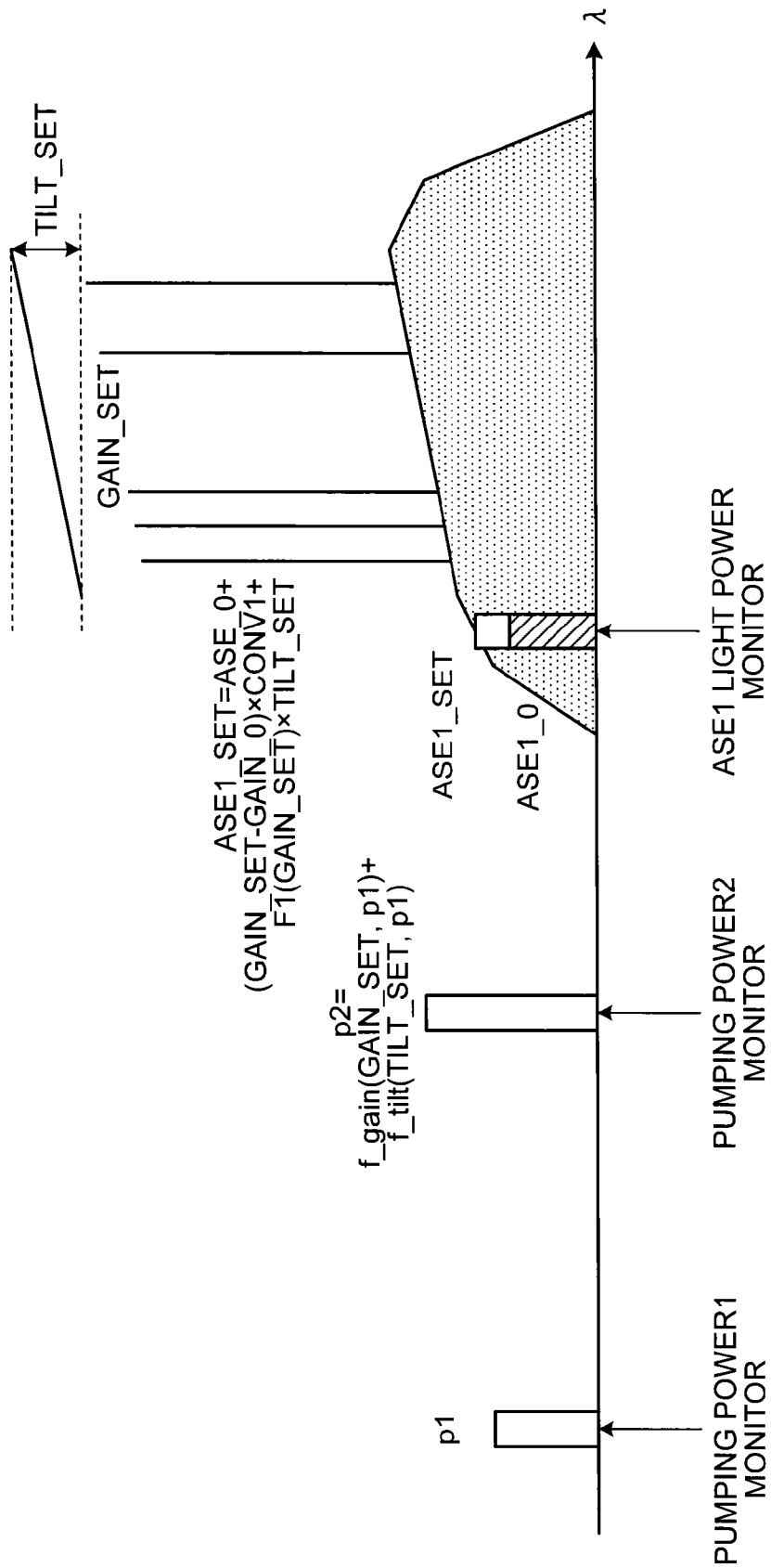
FIG. 16 is a power spectrum diagram for explaining a control in which a gain and a tilt are set initially according to an embodiment 4 of the present invention.

Therefore, as illustrated in FIG. 16, initial setting of the target tilt and the target gain are possible by controlling the ASE light power to a value of ASE1_SET represented as follows.

$$ASE1\_SET=ASE\_0+(GAIN\_SET-GAIN\_0) \times CONV1+F1(GAIN\_SET) \times TILT\_SET$$

Figure 17:
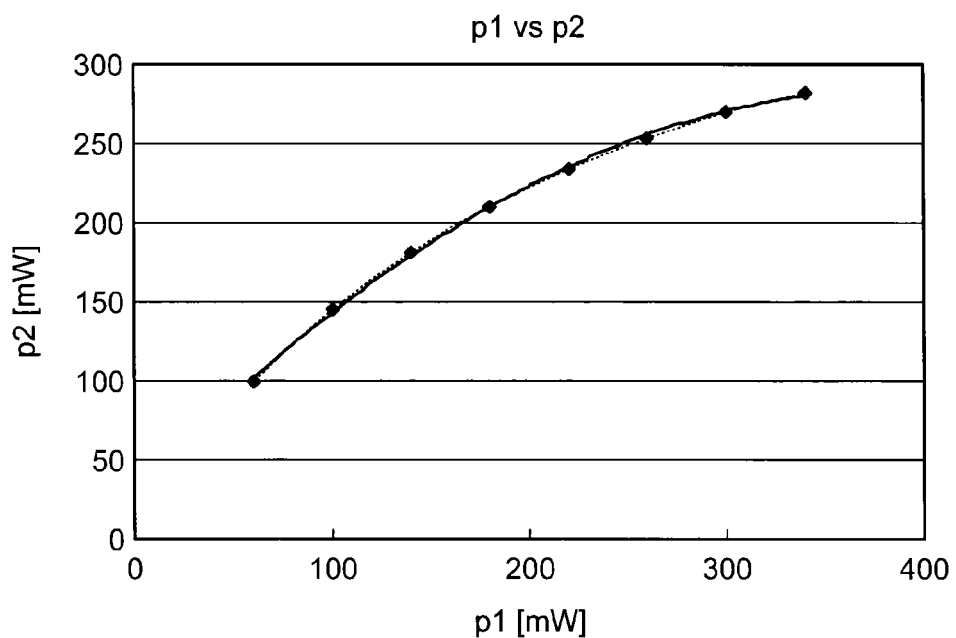
FIG. 17 is a view illustrating an example of a relationship of a pumping light power and another pumping light power in a control in which a gain is set initially according to an embodiment 4 of the present invention.

On the other hand, a gain and a tilt are set initially by other pumping lights following the power of the pumping light. With reference to an example of two pumping lights, a relationship between p1 and p2 corresponding to a set target gain GAIN SET, i.e., $$p2=f\_gain(GAIN\_SET, p1)$$

is obtained in advance by a simulation or an experiment in table form or numerical expression form where p1 is a pumping light power by one pumping light and p2 is a pumping light power by the other pumping light. The relationship between the p1 and the p2 indicated by this equation is, for example, a relationship illustrated in FIG. 17. The relationship illustrated in FIG. 17 is represented by a quadratic expression of $$p2=-0.0016 \times p1^2+-1.286 \times p1+30.907.$$

Figure 18:
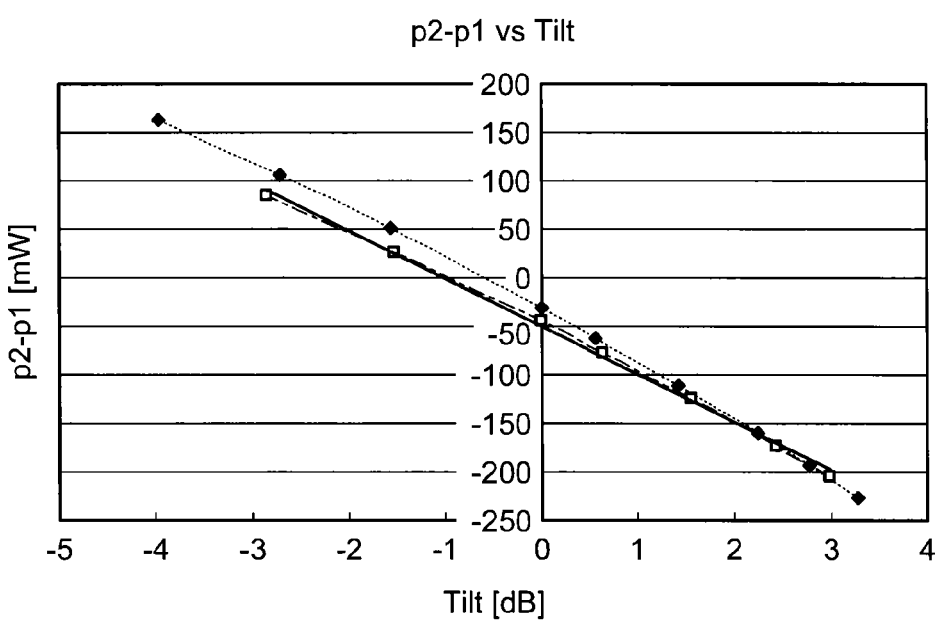
FIG. 18 is a view illustrating an example of a relationship of a pumping light power and another pumping light power in a control in which a tilt is set initially according to the embodiment 4 of the present invention.

Similarly, a relationship between the p1 and the p2 corresponding to the set target tilt TILT_SET, i.e., $$p2=f_{tilt}(TILT\_SET, p1)$$

is obtained in advance in table form or numerical expression form. The relationship of the equation between the p1 and the p2 is, for example, a relationship illustrated in FIG. 18. In FIG. 18, the relationship between the p1 and the p2 can be represented as p2−p1=a×TILT_SET+b, and it is represented as p2=a×TILT_SET+b+p1 in a numerical expression. It is a=−49.398, b=−50.807.

When a pumping light power monitor value by one pumping light when an ASE light power is controlled at the set target gain GAIN_SET and the set target tilt TILT_SET is p1 [mW], a power target value p2 [mW] of the other pumping light can be obtained by $$p2=f\_gain(GAIN\_SET, p1)+f\_tilt(TILT\_SET, p1).$$

That is, a gain and a tilt can be set initially by performing feedback controls of the respective pumping light powers to the above-described p1 and p2.

In a case where the number of pumping lights is equal to or larger than n, a more accurate initial setting of a tilt can be performed by controlling a ratio among the ASE light powers depending on an interval ratio of wavelength of the respective ASE lights.

The embodiment 1 is applicable not only to a Raman amplifier but also an EDFA. As previously described, regarding a stationary control of the optical amplifier by the control unit after a gain is initially set, various control modes can be used, e.g., controlling the pumping light power of the pumping LD to be constant, controlling an output of the optical amplifier to be constant, and controlling a gain of the optical amplifier to be constant.

The present invention is not limited by the above described embodiments. The present invention includes a configuration appropriately combining the above-described elements. Further effects or modification examples can be derived by an ordinary skilled person in the art easily. Therefore, further wide aspects of the present invention are not limited to the specific, detailed, and representative embodiment explained and described above.

As described above, an optical amplifier and a method of controlling an optical amplifier according to the present invention are suitable mainly for use in an optical communication.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical amplifier comprising:
 a pumping light source supplying a pumping light to an optical fiber as an amplification medium;
 an ASE light power detector detecting an ASE light power including an external ASE power flowing from an upstream side outside an amplification signal band; and
 a control unit setting a gain within the amplification signal band by using the ASE light power detected by the ASE light power detector outside the amplification signal band, wherein
 the control unit controls the pumping light source by compensating for an influence of the external ASE power, obtained by measuring a relationship between the gain within the amplification signal band and the ASE light power outside the amplification signal band, to set initially the gain within the amplification signal band.

2. The optical amplifier according to claim 1, wherein, when the control unit compensates for the influence of the external ASE power, the control unit uses a predetermined proportional relationship which is effective between the external ASE power outside the amplification signal band and the external ASE power within the amplification signal band and a predetermined proportional relationship which is effective between the ASE power outside the amplification signal band and the ASE power within the amplification signal band when supplying the pumping light.

3. The optical amplifier according to claim 2, wherein the control unit estimates the gain within the amplification signal band by using the predetermined proportional relationship to control a pumping light output so that the estimated gain reaches a target gain.

4. The optical amplifier according to claim 2, wherein the control unit estimates an ASE light power corresponding to a target gain by using the predetermined proportional relationships to control a pumping light output so that the ASE light power detected by the ASE light power detector reaches the estimated ASE light power.

5. The optical amplifier according to claim 2, wherein the control unit has a function of calibrating the predetermined proportional relationships.

6. The optical amplifier according to claim 1, comprising a plurality of pumping light sources outputting a plurality of pumping lights at different wavelengths, wherein
the plurality of ASE light power detectors are provided corresponding to the plurality of pumping lights, and the ASE light power detectors detect ASE lights corresponding to the pumping lights respectively and not overlapping with each other outside the amplification signal band, and
the control unit sets initially a present gain within the amplification signal band by using a plurality of predetermined proportional relationships between the ASE light powers detected by the ASE light power detectors respectively and the gain within the amplification signal band based on the ASE light powers detected by the ASE light power detectors respectively.

7. The optical amplifier according to claim 6, wherein the control unit sets initially a gain tilt together with the gain within the amplification signal band.

8. The optical amplifier according to claim 1, comprising a plurality of pumping light sources outputting a plurality of pumping lights at different wavelengths, wherein
the ASE light power detector detects an ASE light power corresponding to one of the pumping lights,
a predetermined proportional relationship is between the ASE light power detected by the ASE light power detector and the gain within the amplification signal band, and
the control unit sets initially a present gain corresponding to the one of the pumping lights within the amplification signal band by using the predetermined proportional relationship based on the ASE light power corresponding to the one of the pumping lights, and sets initially other one of the pumping light powers in accordance with a predetermined pumping light power relationship that depends on the one of the pumping light powers with respect to a present gain of the amplification band signal corresponding to the other one of the pumping lights.

9. The optical amplifier according to claim 8, wherein the control unit sets initially the gain and a gain tilt within the amplification signal band in a state in which the predetermined pumping light power relationship includes a gain tilt.

10. A method of controlling an optical amplifier, the method comprising:
detecting an ASE light power including an external ASE power flowing from an upstream side outside an amplification signal band; and
controlling to set initially a gain within the amplification signal band based on the ASE light power in consideration of an influence of the external ASE power, detected at the detecting, outside the amplification signal band.

11. The method according to claim 10, wherein the controlling includes estimating the gain within the amplification signal band by using a predetermined proportional relationship and controlling a pumping light output so that the estimated gain reaches a target gain.

12. The method according to claim 10, wherein the controlling includes estimating an ASE light power corresponding to a target gain by using a predetermined proportional relationship and controlling a pumping light output so that an ASE light power detected by the ASE light power detector reaches the estimated ASE light power.

13. The method according to claim 11, wherein the controlling includes calibrating the predetermined proportional relationship.

14. The method according to claim 12, wherein the controlling includes calibrating the predetermined proportional relationship.

* * * * *